United States Patent [19]
Ebihara et al.

[11] 4,015,288
[45] Mar. 29, 1977

[54] WRITE CLOCK GENERATOR FOR DIGITAL TIME BASE CORRECTOR

[75] Inventors: Norio Ebihara; Mitsushige Tatami, both of Yokohama, Japan

[73] Assignee: Sony Corporation, Tokyo, Japan

[22] Filed: Feb. 13, 1976

[21] Appl. No.: 658,087

[30] Foreign Application Priority Data

Feb. 17, 1975 Japan .............................. 50-19597

[52] U.S. Cl. ................................. 358/19; 358/148
[51] Int. Cl.² .......................................... H04N 1/28
[58] Field of Search ...... 178/69.5 R, 6.6 R, 6.6 TC, 178/69.5 TV; 358/4, 8, 19; 360/57; 331/1 A

[56] References Cited
UNITED STATES PATENTS

| | | | |
|---|---|---|---|
| 3,974,520 | 8/1976 | Kuroyanagi | 178/69.5 R |
| 3,978,519 | 8/1976 | Stalley et al. | 358/8 |

*Primary Examiner*—Benedict V. Safourek
*Attorney, Agent, or Firm*—Lewis H. Eslinger; Alvin Sinderbrand

[57] ABSTRACT

A write clock generator of a digital time base corrector for removing time base errors from color video signals includes a voltage controlled oscillator (VCO) in a phase lock loop by which the oscillator output or write clock pulses, after being suitably divided, are compared, as to phase, with the horizontal synchronizing signals and the burst signals separated from the video signals for controlling the VCO on the basis of both comparisons. In order to avoid a lock-out condition of the phase lock loop as a result of variation in the time relationship of the horizontal synchronizing signals and the onset of the respective burst signals, the oscillator output which has been divided to generally correspond to the frequency of the burst signals is employed to produce first and second trains of pulses having the same frequency as such divided output but being out of phase with respect to each other, and one or the other of the trains of pulses is selected, in response to the timing of the burst signals, for phase comparison with the burst signals of the train of pulses which is substantially out of phase in respect to the latter.

9 Claims, 14 Drawing Figures

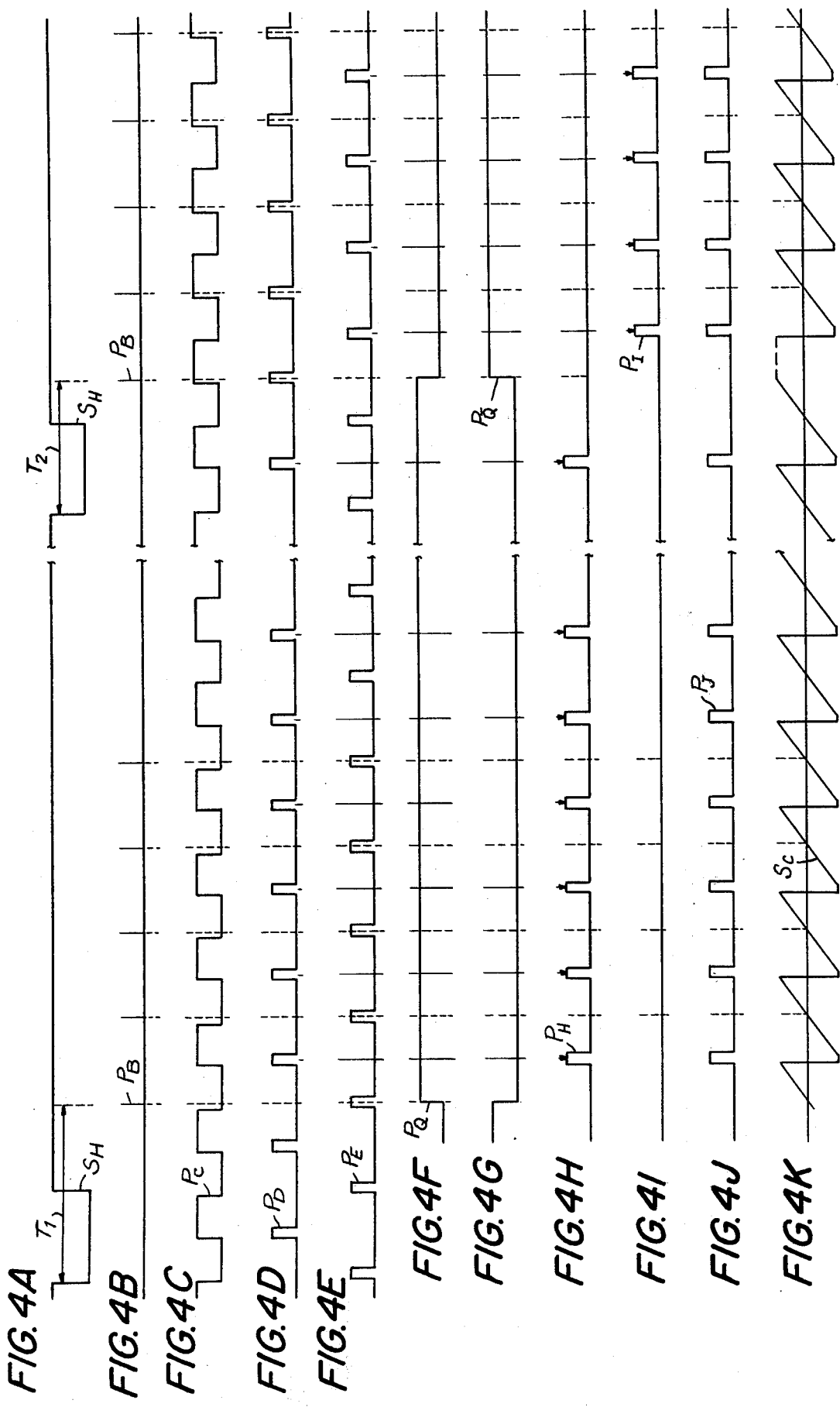

WRITE CLOCK GENERATOR FOR DIGITAL TIME BASE CORRECTOR

BACKGROUND OF THE INVENTION

1. Field of the Invention

This invention relates generally to a write clock generator, and more particularly is directed to a write clock generator for use in a digital time base corrector by which time base errors are removed from periodic information signals, such as, color video signals.

2. Description of the Prior Art

Video signals are frequently recorded on magnetic tape and subsequently reproduced for later broadcasting or viewing purposes. During the reproduction of recorded video signals, time base or frequency errors may be introduced as a result of expansion or contraction of the record medium during or after recording, variation in the speed of the tape relative to the magnetic head or heads during recording or reproduction, variation between the tape recording speed and the tape reducing speed, and the like. The presence of such time base errors in the reproduced video signals causes a frequency shift of the latter which can result in many observable undesirable effects, particularly when the preproduced video signals are to be transmitted or broadcast and may be mixed with live broadcast material or other reproduced video signals that do not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

In view of the foregoing, it has been proposed, for example, as disclosed in U.S. Pat. No. 3,860,952, or in U.S. Pat Application Ser. No. 642,197, filed Dec. 18, 1975, and having a common assignee herewith, to provide a time base corrector for processing video signals in which the incoming video signals are converted from analog to digital form and temporarily stored in a memory unit. Time base errors are removed from the video signals by writing the digitized signals in the memory unit at a clocking rate which varies in a manner generally proportional to the time base errors, and by fetching or reading out the stored signals at a standard clocking rate, whereupon the read-out digitized video signals are reconverted to analog form.

In a time base corrector of the above described type, it is known to determine the clocking rate at which the digitized signals are written in the memory unit by means of a write clock generator including a voltage controlled oscillator (VCO) in a phase lock loop by which the oscillator output or write clock pulses, after being suitably divided, are compared, as to phase, with at least the horizontal synchronizing signals separated from the video signals for controlling the VCO on the basis of such comparison. In the case where color video signals are being processed for removing time base errors therefrom, it is further known to control the output frequency of the VCO on the basis of the burst signals, as well as the horizontal synchronizing signals, separated from the incoming color video signals so that more accurate compensation or correction of any time base errors can be achieved by means of the described digital time base corrector. The foregoing write clock generator performs satisfactorily in the time base corrector so long as the time relation between each horizontal synchronizing signal and the onset of the respective burst signal is fixed. However, in practice, a relatively wide variation may exist in the time relation between the horizontal synchronizing signals and respective burst signals of color video signals from various sources, for example, as reproduced by a VTR or as obtained from a color video camera so that, if the input to the time base corrector is constituted by reproduced color video signals from a VTR which are edited or mixed with live broadcast material or color video signals from a camera, there will be a periodic changing or shifting in the time relationship between the horizontal synchronizing signals and the respective burst signals. Further, even if the input to the time base corrector is continuously color video signals from a helical scan-type VTR, the time relation between the horizontal synchronizing signals and the respective burst signals may be changed from time to time as a result of skew jitter appearing in the reproduced color video signals due to longitudinal shrinkage or expansion of the magnetic tape. In any case, changes in the time relation between the horizontal synchronizing signals and the respective burst signals of the color video signals applied to the time base corrector can cause a lockout condition of the phase lock loop included in the write clock generator. When such lockout condition occurs, accurate correction or compensation for any time base errors of the incoming color video signals can no longer be achieved.

OBJECTS AND SUMMARY OF THE INVENTION

Accordingly, it is an object of this invention to provide a write clock generator for a digital time base corrector which avoids the above described problems encountered in the prior art.

More specifically, it is an object of this invention to provide a write clock generator, as aforesaid, in which a voltage controlled oscillator in a phase lock loop has its output frequency varied in response to time base errors detected in the horizontal synchronizing signals and burst signals separated from incoming color video signals, and in which a lockout condition of the phase lock loop is prevented even when the time relationship of the separated horizontal synchronizing signals and respective burst signals may undergo substantial variations.

Another object is to provide a write clock generator, as aforesaid, which is comprised of a relatively simple assembly of circuit components.

In accordance with an aspect of this invention, a write clock generator includes a voltage controlled oscillator (VCO) in a phase lock loop by which the oscillator output or write clock pulses, after being suitably divided, are compared in phase with the horizontal synchronizing signals and the burst signals separated from incoming color video signals for controlling the VCO on the basis of both comparisons, and a lockout condition of the phase lock loop is avoided by employing the oscillator output which has been divided to generally correspond to the frequency of the burst signals to produce first and second trains of pulses having the same frequency as such divided output but being out of phase with respect to each other, and by selecting one or the other of the trains of pulses which is substatially out of phase in respect to the separated burst signals for phase comparison with the latter in the phase lock loop.

In a preferred embodiment of the invention, the selection of one or the other of the trains of pulses for phase comparison with the separated burst signals is effected by means of a J-K flip-flop having its J and K inputs respectively receiving the first and second trains of pulses, while the separated burst signals are applied to a timing input of the flip-flop so that the latter produces a first output when the burst signals and first train of pulses occur simultaneously and switches over to a second output when the burst signals and second train of pulses occur simultaneously, with the first and second outputs from the flip-flop being employed for gating gates through which the second and first trains of pulses, respectively, are selectively supplied for phase comparison with the separated burst signals.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

FIGS. 4A–4K are waveform diagrams to which reference will be made in explaining the operation of the write clock generator of FIG. 3.

DESCRIPTION OF A PREFERRED EMBODIMENT

Figure 1:
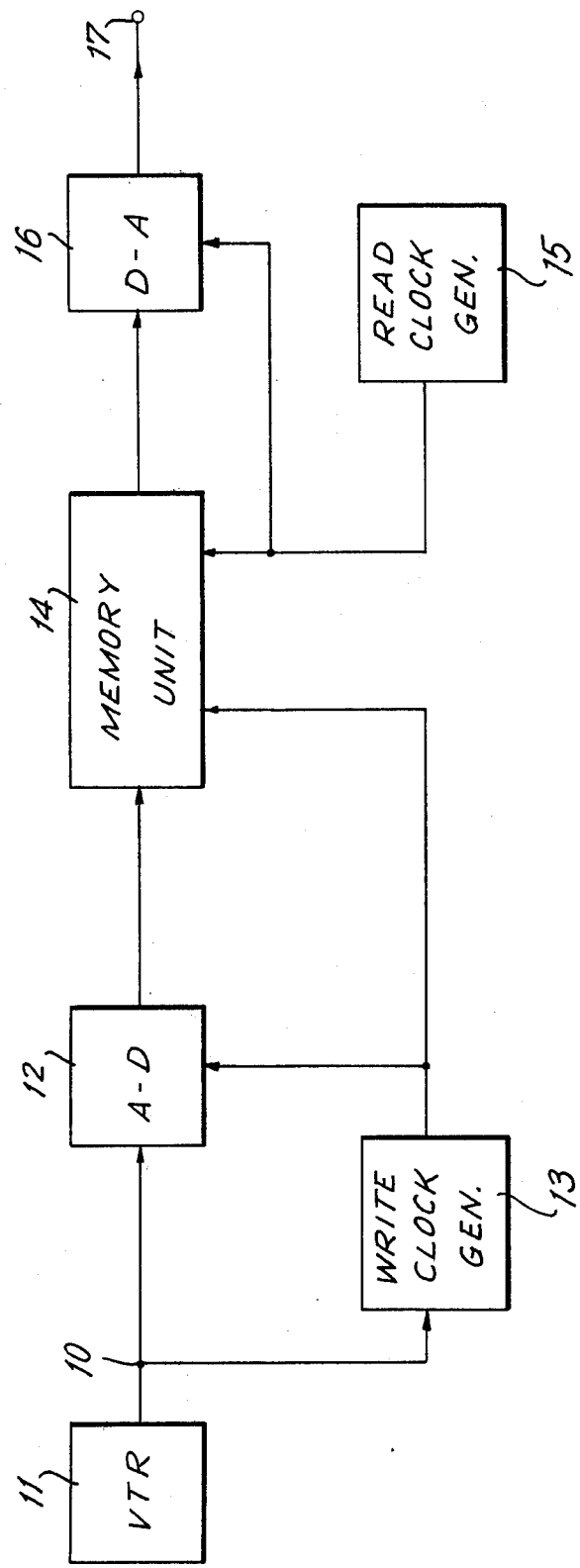
FIG. 1 is a schematic block diagram showing the basic components of a digital time base corrector of the type in which a write clock generator according to this invention may be employed.

Referring to the drawings in detail and initially to FIG. 1 thereof, it will be seen that a time base corrector of a type in which the present invention can be employed has an input terminal 10 to which periodic information signals, such as, color video signals reproduced by a VTR 11, are applied. The video signals received at input terminal 10 are applied to an analog-to-digital or A-D converter 12 and also to the input of a write clock generator 13 which produces write clock pulses having a relatively high frequency, for example, of about 21.48MHz which is 6 times the color sub-carrier frequency for NTSC signals, and which is dependent upon time base errors in the incoming video signals. The write clock pulses produced by generator 13 are applied to A-D converter 12 to control the rate at which the latter samples the incoming color video signals and converts the latter from their original analog form into digital form. The write clock pulses produced by generator 13 are further applied to a memory unit 14 for determining the rate at which the signals sampled and converted to digital form by converter 12 are stored in memory unit 14. After storage in memory unit 14, the digitized video information is fetched from memory unit 14 at a standard reading rate in response to read clock pulses having a standard or fixed frequency, for example, of 21.48 MHz, and which are applied to memory unit 14 from a read clock generator 15. The read clock pulses from generator 15 are also applied to a digital-to-analog or D-A converter 16 which is operative to convert the digitized video signals sequentially read-out from memory unit 14 back to the original analog form, whereupon, such video signals in analog form are applied to an output terminal 17. It will be apparent that, in the time base corrector as described above, successive horizontal or line intervals of the incoming video signals are written in memory unit 14 at a clocking rate which varies generally in accordance with the time base errors of the incoming signals, and that the video signals are read out from memory unit 14 at a standard clocking rate so that the video signals obtained at output terminal 17 have any time base errors removed therefrom.

When the above described time base corrector is to be employed for removing time base errors in color video signals, the write clock generator 13 thereof is preferably controlled by both horizontal synchronizing signals and burst signals separated from the incoming color video signals so that the generated write clock pulses will more accurately reflect the time base errors occurring in the incoming signals. As shown on FIG. 2, in such a write clock generator 13 according to the prior art, the color video signals applied to input terminals 10 of the time base corrector are supplied to a horizontal synchronizing signal separator 18 which separates the horizontal synchronizing signals or pulses $S_H$ from the incoming color video signals and applies the separated horizontal synchronizing signals to one input of a phase comparator 19. The separated horizontal synchronizing signals $S_H$ are further applied, as a gating signal, to a burst signal separator or gate 20 by which the burst signals are separated from the color video signals applied to input terminal 10. A voltage controlled oscillator (VCO) 21 is provided for producing the write clock pulses with a center frequency $f_o$ which is selected to be a common multiple of the standard horizontal or line frequency $f_H$ and the standard burst sub-carrier frequency $f_S$ of the incoming color video signals, as below:

$$f_o = N \cdot f_H = n \cdot f_S$$

in which $N$ and $n$ are positive integers. In the case where the incoming signals are NTSC color video signals, so that $f_H$ equals 15.75 KHz and $f_S = 3.58$ MHz, the value of $N$ may be 1365 and the value of $n$ may be 6, for example, so that the center frequency of the output from VCO 21 will be 21.48 MHz.

The VCO 21 is included in a phase lock loop and, thus, has its output applied to a divider 22, for example, in the form of a pulse counter, in which the frequency $f_o$ of the write clock pulses from VCO 21 is divided by $N$ so that the output of divider 22 has a frequency approximately equal to the standard horizontal or line frequency $f_H$. The output of divider 22 is applied to a sawtooth generator 23 which produces a corresponding sawtooth signal applied to another input of phase comparator 19. The phase comparator 19 detects the level of the sawtooth signal from generator 23 at the occurrence of each horizontal synchronizing signal received from separator 18 so as to establish a corresponding level of a first control voltage or error signal applied to an adder 24. As shown, the phase lock loop of the known write clock generator 13 may further include a divider 25 which may also be in the form of a pulse counter, and in which the frequency of the write clock pulses received from VCO 21 is divided by n so as to provide an output signal from divider 25 having a frequency approximately equal to the standard burst sub-carrier frequency $f_S$ of the incoming color video signals. Such divided output of the divider 25 is applied to a sawtooth generator 26 which produces a corresponding sawtooth signal $S_C$ applied to one input of a phase comparator 27. The burst signals $S_B$ separated from the incoming color video signals by the burst separator or gate 20 are applied to a pulse forming circuit 28 which detects the zero or cross-over point of the sine wave constituting the burst signals and produces a train of pulses $P_B$ representing the phase of the burst signals included in the incoming color video signals. The train of pulses $P_B$ from pulse forming circuit 28 are applied to another input of phase comparator 27 which detects the level of the sawtooth signal from the sawtooth generator 26 at the occurrence of each of the pulses $P_B$ from the pulse forming circuit 28 so as to establish a corresponding level of a respective control voltage or error signal which is also applied to the adder 24. It will be apparent that the adder 24 combines the control voltages or error signals from the phase comparators 19 and 27, respectively, so as to provide a corresponding control voltage for the VCO 21. Thus, the output frequency of VCO 21 is controlled by both the horizontal synchronizing signals and burst signals separated from the incoming color video signals with the result that the write clock pulses produced by VCO 21 may accurately correspond to time base errors appearing in the incoming color video signals. The described write clock generator according to the prior art can function satisfactorily so long as the time relation or interval between the separated horizontal synchronizing signals and the onset of the respective burst pulse signals is fixed. However, as previously described, the foregoing time relation or interval is subject to substantial variation, in which case a lockout condition of the phase lock loop in the known write clock generator may occur with the result that accurate correction or compensation for time base errors appearing in the incoming color video signals can no longer be achieved. Referring now to FIG. 3, it will be seen that a write clock generator 13' according to an embodiment of this invention includes components which correspond to components of the known write clock generator 13 of FIG. 2 and which are identified by the same reference numerals. In accordance with this invention, the clock pulse generator 13' further comprises signal generating means 29 receiving the divided output $P_C$ (FIG. 4C) from the divider 25 and producing a first train of pulses $P_D$ (FIG. 4D) and a second train of pulses $P_E$ (FIG. 4E) at the frequency of the divided output $P_C$ and having different phases from each other, and signal selecting means 30 responsive to the separated burst signals, for example, receiving the corresponding burst signal pulses $P_B$ (FIG. 4B) from the pulse forming circuit 28, for selecting the one of the trains of pulses $P_D$ and $P_E$ which is substantially out of phase in respect to the separated burst signals for application to the sawtooth generator 26.

More particularly, in the illustrated embodiment of the invention, the signal generating means 29 is shown to include a monostable multivibrator 31 having a relatively short time constant, and which receives the divided output $P_C$ obtained from divider 25 and having a frequency substantially equal to the standard burst subcarrier frequency $f_S$. By reason of the short time constant of the monostable multivibrator 31, the latter produces the train of pulses $P_D$ which are triggered by the leading edges of the divided output pulses $P_C$. The signal generating means 29 is further shown to include a pulse delay circuit 32 which receives the output $P_D$ of monostable multivibrator 31 and has a delay time substantially equal to one-half the period of the train of pulses $P_D$ so that the train of pulses $P_E$ issuing from pulse delay circuit 32 will have the same frequency or repetition rate as the train of pulses $P_D$, but will be out of phase in respect to the latter.

Further, as shown in FIG. 3, the signal selecting means 30 may include a J-K flip-flop 33 having a J-input and a K-input which respectively receive the trains of pulses $P_E$ and $P_D$, and a timing or T-input which receives the burst pulse signals $P_B$ from pulse forming circuit 28. The J-K flip-flop 33 is further shown to have outputs Q and $\overline{Q}$ which are connected to gating inputs of AND gates 34 and 35. Another input of AND gate 34 is shown to be connected to the output of monstable multivibrator 31 for receiving the train of pulses $P_D$ from the latter, while another input of AND gate 35 is shown to be connected to the output of pulse delay circuit 32 for receiving the train of pulses $P_E$ from the latter. Finally, in the signal selecting means 30 of the illustrated embodiment, the outputs of AND gates 34 and 35 are connected through an OR gate 36 to the input of sawtooth generator 26.

Figure 2:
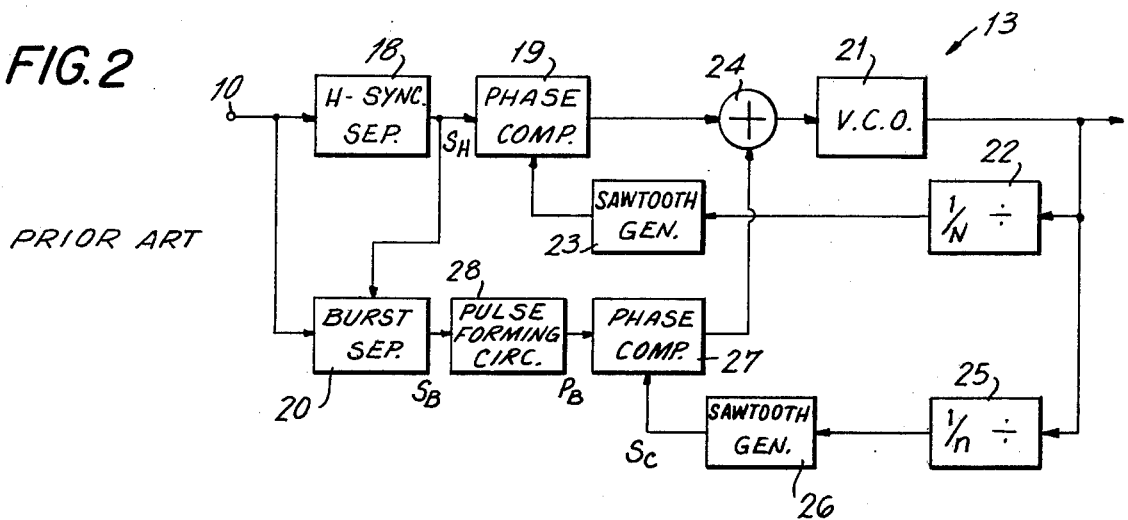
FIG. 2 is a schematic block diagram showing the components of a write clock generator of the prior art which has been employed in a time base corrector of the type shown on FIG. 1.
Figure 3:
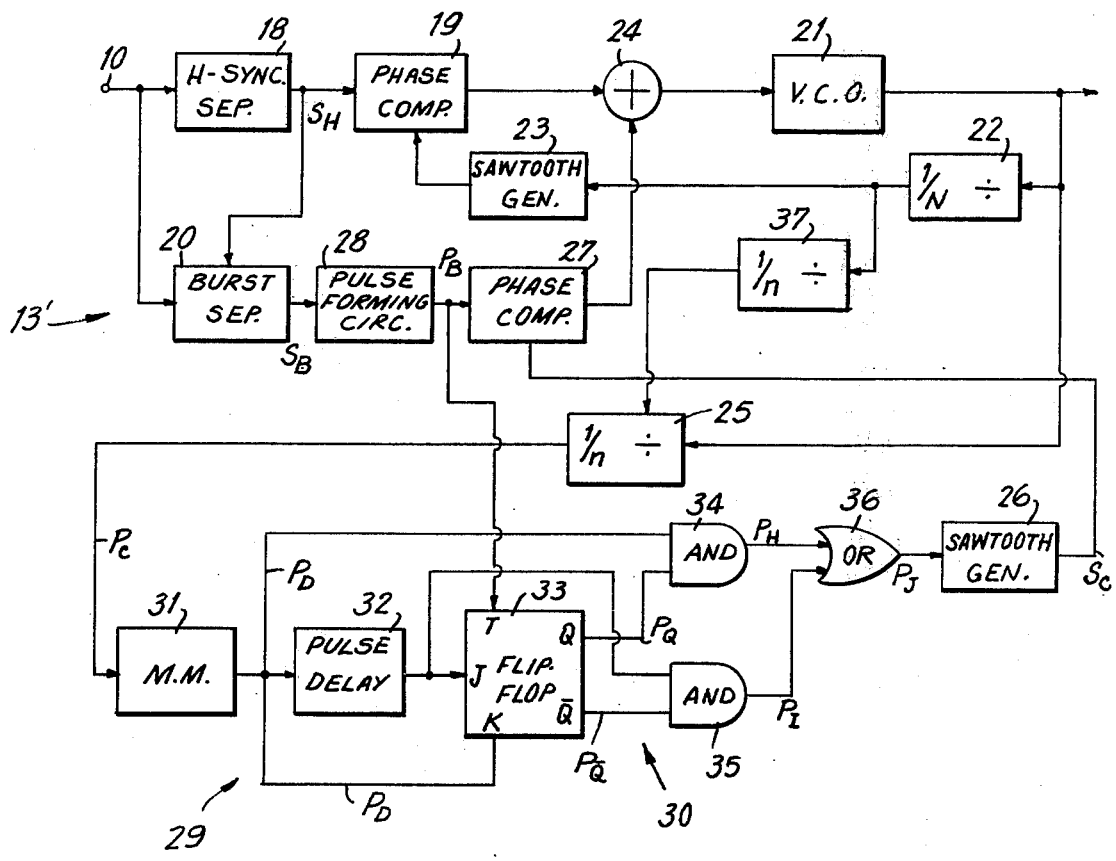
FIG. 3 is a schematic block diagram showing the components of a write clock generator according to an embodiment of the present invention.

It will be noted that, in the write clock generator 13 according to the prior art, as shown in FIG. 2, the phase or initial count of the divide by N divider 22 and the phase or initial count of the divide by $n$ divider 25 may have no relation to each other at the moment when power is initially applied through closing of a suitable switch for operation of the write clock generator. Therefore, in the write clock generator 13' according to this invention as shown on FIG. 3, the divided output of the divide by N divider or pulse counter 22 is applied through a divide by 2 divider or pulse counter 37 to a reset terminal of the divide by n divider or pulse counter 25 for the purpose of obtaining synchronization of the dividers 22 and 25 when operation of the write clock generator 13 is initiated. In other words, the divide by n divider or pulse counter 25 is reset after every two horizontal intervals of the video signals.

The above described write clock generator 13' according to this invention operates as follows:

Assuming initially that the time relation of the horizontal synchronizing signals and the onset of the respective burst signals separated from the incoming color video signals is such as to provide the time delay $T_1$ between each separated horizontal synchronizing signal $S_H$ and the initial burst pulse signal $P_B$ obtained from pulse forming circuit 28, as shown on the left-hand portion of FIGS. 4A-4K, then it will be seen that, at the time when the burst pulse $P_B$ is applied to the timing or T-input of J-K flip-flop 33, the J-input of flip-flop 33 receives the nominally high voltage "1" of the train of pulses $P_E$, while the K-input of flip-flop 33 receives the nominally low or zero voltage "O" of the pulse train $P_D$. Under the foregoing circumstances, the gating signal $P_Q$ obtained at the Q-output of flip-flop 33 attains the nominally high level "1" while the signal $P_{\overline{Q}}$ at the $\overline{Q}$-output of the flip-flop is at the zero level "O". Consequently, the AND gate 34 is gated by the signal $P_Q$ to provide the train of pulses $P_H$ (FIG. 4H) at its output corresponding to the train of pulses $P_D$, while the AND gate 35 is closed or blocks the train of pulses $P_E$. Accordingly, the train of pulses $P_J$ (FIG. 4J) obtained from OR gate 36 corresponds to the train of pulses $P_D$ and triggers sawtooth generator 26 so that the resulting sawtooth signal $S_C$ (FIG. 4K) applied to phase comparator 27 is timed to have its slopping portions substantially bisected by the corresponding burst pulse signals $P_B$ in the event that the incoming color video signals are free of time base errors.

However, if the time relation between the separated horizontal synchronizing signals and the onset of the respective burst signals is changed, for example, so that the time delay from each separated horizontal synchronizing signal $S_H$ to the initial burst pulse signal $P_B$ is reduced to the value indicated at $T_2$ on the right-hand portion of FIGS. 4A–4K, as would cause a lockout condition of the phase lock loop in the write clock generator 13 of the prior art, such lockout condition is avoided in the write clock generator 13' according to this invention as follows:

When the initial burst pulse signal $P_B$ is delayed by the time $T_2$ from the respective separated horizontal synchronizing signal $S_H$, the timing or T-input of flip-flop 33 receives such burst pulse signal $P_B$ at a time when the train of pulses $P_E$ applied to the J-input and the train of pulses $P_D$ applied to the K-input of flip-flop 33 have the nominal values 0 and 1, respectively. As a result of the foregoing, the signal $P_{\bar{Q}}$ appearing at output $\bar{Q}$ of flip-flop 33 has the value 1 for gating or opening AND gate 35, while the signal $P_Q$ at output Q of the flip-flop has the value 0 for closing AND gate 34. Thus, the train of pulses $P_E$ is passed through AND gate 35 as the output $P_I$ (FIG. 41) from the latter and the output $P_J$ now obtained from OR gate 36 for triggering sawtooth generator 26 corresponds to the train of pulses $P_E$, as shown on the right-hand portion of FIG. 4J. Accordingly, the sawtooth signal $S_C$ produced by sawtooth generator 26 for application to phase comparator 27 once again has its sloping portions substantially bisected, in point of time, by the burst pulse signals $P_B$ in the event that the incoming color video signals are free of time base errors.

From the foregoing, it will be apparent that, in the write clock generator 13' according to this invention, abrupt changes in the time relation between the separated horizontal synchronizing signals and the onset of the respective separated burst signals, for example, from the time relation indicated at $T_1$ to that indicated at $T_2$, does not result in a change in the control voltage or error signal from phase comparator 27, and thus avoids a lockout condition of the phase lock loop.

Of course, with the time relation $T_1$ or $T_2$ between the separated horizontal synchronizing signals and the onset of the respective separated burst signals, any change in the frequency of the horizontal synchronizing signals and/or in the frequency of the burst signals in response to a time base error in the incoming color video signals will result in corresponding shifts of the separated horizontal synchronizing signals $S_H$ and/or of the burst pulse signals $P_B$ relative to the sloping portions of the sawtooth signals from generators 23 and 26, respectively. Thus, the control voltage from comparator 19 and/or from comparator 27 will be varied to suitably change the output frequency of VCO 21 in correspondence with the time base error in the incoming color video signals.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A write clock generator for a digital time base corrector employed for removing time base errors from information signals containing first and second reference signals respectively having different standard frequencies and which may have varying time relations to each other; said write clock generator comprising a voltage controlled oscillator for producing a write clock pulse with a center frequency which is a first multiple of the standard frequency of said first reference signal and a second multiple of the standard frequency of said second reference signal, first and second dividers receiving said write clock pulse and dividing the latter by said first and second multiples, respectively, for providing first and second divided outputs, first and second separators for separating said first and second reference signals, respectively, from the information signals, first phase comparing means receiving the separated first reference signal and said first divided output for producing a first control voltage corresponding to the phase difference therebetween, signal generating means receiving said second divided output and producing at least first and second trains of pulses at the frequency of said second divided output and having different phases from each other, signal selecting means responsive to the separated second reference signal for selecting the one of said trains of pulses which is substantially out of phase in respect to said separated second reference signal, second phase comparing means receiving said separated second reference signal and the selected one of said trains of pulses for producing a second control voltage corresponding to the phase difference therebetween, and means for combining said first and second control voltages so as to control said voltage controlled oscillator therewith.

2. A write clock generator according to claim 1; in which said signal selecting means includes a J–K flip-flop having J and K inputs respectively receiving said first and second trains of pulses and a timing input receiving said separated second reference signal, said J–K flip-flop producing a first output when said separated second reference signal and said first train of pulses occur simultaneously and switching over to a second output when said separated second reference signal and said second train of pulses occur simultaneously, first gating means passing said first train of pulses in response to said second output from said J–K flip-flop, second gating means passing said second train of pulses in response to said first output from said J–K flip-flop, and means for connecting the outputs of said first and second gating means to said second phase comparing means.

3. A write clock generator according to claim 2; in which said signal generating means for producing said first and second trains of pulses includes a monostable-multivibrator receiving said second divided output and producing said first train of pulses in phase therewith, and delay means receiving said first train of pulses and having a delay time substantially equal to one-half the period of said first train of pulses for providing said second train of pulses at the output of said delay means.

4. A write clock generator according to claim 1; in which said signal generating means for producing said first and second trains of pulses includes a monostable-multivibrator receiving said second divided output and producing said first train of pulses in phase therewith, and delay means receiving said first train of pulses and having a delay time substantially equal to one-half the period of said first train of pulses for providing said second train of pulses at the output of said delay means.

5. A write clock generator according to claim 1; in which said first phase comparing means includes a first sawtooth generator actuated by said first divided output to produce a corresponding sawtooth signal, and a first phase comparator which detects the level of said sawtooth signal at the occurrence of said separated first reference signal to establish said first control voltage; and in which said second phase comparing means includes a second sawtooth generator actuated by said selected one of the trains of pulses to produce a corresponding sawtooth signal, and a second phase comparator which detects the level of said sawtooth signal from said second sawtooth generator at the occurrence of said separated second reference signal to establish said second control voltage.

6. A write clock generator according to claim 5; in which said signal selecting means includes a J-K flip-flop having J and K inputs respectively receiving said first and second trains of pulses and a timing input receiving said separated second reference signal, said J-K flip-flop producing a first output when said separated second reference signal and said first train of pulses occur simultaneously and switching over to a second output when said separated second reference signal and said second train of pulses occur simultaneously, first gating means passing said first train of pulses in response to said second output from said J-K flip-flop, second gating means passing said second train of pulses in response to said first output from said J-K flip-flop, and means for connecting the outputs of said first and second gating means to said second phase comparing means.

7. A write clock generator according to claim 6; in which said signal generating means for producing said first and second trains of pulses includes a monostable-multivibrator receiving said second divided output and producing said first train of pulses in phase therewith, and delay means receiving said first train of pulses and having a delay time substantially equal to one-half the period of said first train of pulses for providing said second train of pulses at the output of said delay means.

8. A write clock generator according to claim 1; in which said information signals are color video signals including horizontal synchronizing signals and burst signals constituting said first and second reference signals, respectively.

9. A write clock generator according to claim 1; in which said first and second dividers are respectively first and second counting circuits; and further comprising means operated by the output of said first counting circuit for periodically resetting said second counting circuit.

* * * * *